(12) United States Patent
Burdick et al.

(10) Patent No.: US 6,433,056 B1
(45) Date of Patent: Aug. 13, 2002

(54) FLUIDIZED POLYMER SUSPENSION OF HYDROPHOBICALLY MODIFIED POLY (ACETAL- OR KETAL-POLYETHER) POLYURETHANE AND POLYACRYLATE

(75) Inventors: Charles Lee Burdick, Landenberg, PA (US); Arjun Chandra Sau, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 08/953,140

(22) Filed: Oct. 17, 1997

(51) Int. Cl.[7] ................................................. A01J 25/12
(52) U.S. Cl. ....................................... 524/394; 524/447
(58) Field of Search .................................. 524/394, 447

(56) References Cited

U.S. PATENT DOCUMENTS

| | | | |
|---|---|---|---|
| 3,894,879 A | 7/1975 | Colegrove | 106/189 |
| 3,894,880 A | 7/1975 | Colegrove | 106/208 |
| 4,008,202 A | 2/1977 | Evani et al. | 260/47 |
| 4,079,028 A | 3/1978 | Emmons et al. | 260/29.6 |
| 4,155,892 A | 5/1979 | Emmons et al. | 260/29.2 |
| 4,288,639 A | 9/1981 | Camp et al. | 568/625 |
| 4,304,902 A | 12/1981 | Landoll | 528/419 |
| 4,327,008 A | 4/1982 | Schimmel et al. | 524/104 |
| 4,354,956 A | 10/1982 | Camp et al. | 252/316 |
| 4,374,216 A | 2/1983 | Dammann | 524/35 |
| 4,384,096 A | 5/1983 | Sonnabend | 526/313 |
| 4,421,902 A | 12/1983 | Chang et al. | 526/317 |
| 4,423,199 A | 12/1983 | Chang et al. | 526/307.6 |
| 4,425,469 A | 1/1984 | Emmons et al. | 524/750 |
| 4,426,485 A | 1/1984 | Hoy et al. | 524/591 |
| 4,429,097 A | 1/1984 | Chang et al. | 526/317 |
| 4,432,881 A | 2/1984 | Evani | 252/8.5 |
| 4,453,979 A | 6/1984 | DeMasi et al. | 106/188 |
| 4,463,151 A | 7/1984 | Schultz et al. | 526/307.5 |
| 4,463,152 A | 7/1984 | Schult et al. | 526/307.5 |
| 4,496,708 A | 1/1985 | Dehm et al. | 528/76 |
| 4,499,233 A | 2/1985 | Tetenbaum et al. | 524/591 |
| 4,514,552 A | 4/1985 | Shay et al. | 526/301 |
| 4,663,385 A | 5/1987 | Chang et al. | 524/523 |
| 4,722,962 A | 2/1988 | Shay et al. | 524/548 |
| 4,799,962 A | 1/1989 | Ahmed | 106/188 |
| 4,883,536 A | 11/1989 | Burdick | 106/194 |
| 4,883,537 A | 11/1989 | Burdick | 424/76.3 |
| 4,904,466 A | 2/1990 | Carson et al. | 529/49 |
| 5,023,309 A | 6/1991 | Kruse et al. | 106/197.1 |
| 5,080,717 A | 1/1992 | Young | 424/70 |
| 5,100,658 A | 3/1992 | Bolich, Jr. et al. | 424/70 |
| 5,104,646 A | 4/1992 | Bolich, Jr. et al. | 424/70 |
| 5,106,609 A | 4/1992 | Bolich, Jr. et al. | 424/70 |
| 5,124,389 A | 6/1992 | Mente | 524/378 |
| 5,228,908 A | 7/1993 | Burdick et al. | 106/194 |
| 5,228,909 A | 7/1993 | Burdick et al. | 106/194 |
| 5,281,654 A | 1/1994 | Eisenhart et al. | 524/500 |
| 5,320,672 A | 6/1994 | Whalen-Shaw | 106/287.24 |
| 5,342,883 A | 8/1994 | Jenkins et al. | 524/845 |
| 5,362,312 A | 11/1994 | Skaggs et al. | 106/189 |
| 5,487,777 A | 1/1996 | Lundan et al. | 106/188 |
| 5,489,638 A | 2/1996 | Burdick | 524/394 |
| 5,541,241 A | 7/1996 | Burdick et al. | 524/45 |
| 5,574,127 A | 11/1996 | Sau | 528/125 |
| 5,578,168 A | 11/1996 | Burdick et al. | 162/164.3 |
| 5,637,556 A | 6/1997 | Argillier et al. | 507/120 |

FOREIGN PATENT DOCUMENTS

| | | |
|---|---|---|
| EP | 166958 B | 1/1986 |
| EP | 0482533 A2 | 4/1992 |
| WO | 96 40185 | 12/1996 |
| WO | 96 40625 | 12/1996 |
| WO | 96 40820 | 12/1996 |

OTHER PUBLICATIONS

Jenkins, R.D.; Silebi, C.A.; El–Aasser, M.S., Steady Shear and Linear Viscoelastic Material Properties of Associative Thickener Solutions, Polym. Mater. Sci. Eng., vol. 61, pp. 629–633, 1989.

Ilg, Helmut; Roempp, Walter, Synthesis and Application of Modified Dodecylpolyglycolesters, Melliand Textilber. Int., vol. 54, No. 6, pp. 661–667, 1973.

D. Hourdet et al., "Synthesis of Thermoassociative Copolymers", POLYMER, vol. 38, No. 10, May, 1997, pp. 2535–2547.

*Primary Examiner*—Kriellion Sanders
(74) *Attorney, Agent, or Firm*—Martin F. Sloan; Ivan G. Szanto

(57) ABSTRACT

Aqueous suspensions of water-soluble hydrophobically modified polyurethanes, polyacrylates and poly(acetal- or ketal-polyethers) and carbon containing salts, process of making the suspensions and process of using them as thickeners for aqueous systems.

24 Claims, No Drawings

FLUIDIZED POLYMER SUSPENSION OF HYDROPHOBICALLY MODIFIED POLY (ACETAL- OR KETAL-POLYETHER) POLYURETHANE AND POLYACRYLATE

BACKGROUND OF THE INVENTION

1. Field of Invention

The present invention relates to novel rheological modifiers and more particularly it relates to aqueous fluid polymer suspensions of hydrophobically modified polyacrylates, polyurethanes and poly(acetal- or ketal-polyethers).

2. Description of the Prior Art

It is desired by the latex paint industry to employ liquid rheology modifiers, rather than powders, for ease of incorporating these into paint formulations. A number of liquid thickeners are commercially available either in the form of solutions of these polymers in mixed solvents, or in the form of aqueous suspensions of these polymers as is described in the prior art references cited below.

In contrast to the prior art thickeners for paint containing volatile organic solvents it is preferred by the paint industry, as an environmental safeguard, to incorporate ingredients into latex paint that have little or no volatile organic compounds (VOCs) present. Thus, it is preferentially desired to employ water as a carrier medium with which to add these polymers to the paint.

It has been found in the prior art that water can be modified with various salts such as diammonium phosphate, diammonium sulfate or sodium formate salt to convert this medium to a non-solvent carrier for suspensions of specific water-soluble polymers. For example, U.S. Pat. No. 4,883,536 describes suspensions of hydroxyethylcellulose prepared in concentrated aqueous solutions of diammonium sulfate or diammonium phosphate, and that these suspensions in turn were useful for rheology modification of latex paint. U.S. Pat. No. 5,228,908 describes that concentrated aqueous sodium formate solution can be employed for preparation of fluid suspensions of the polymers such as hydroxyethylcellulose as well. In U.S. Pat. No. 5,578,168 the use of a number of salts, including sodium formate, were shown to be useful for preparing aqueous suspensions of poly(ethylene oxide). In U.S. Pat. No. 5,541,241 and U.S. Pat. No. 5,489,638 it was demonstrated that sodium formate and other salts were useful for preparing aqueous suspensions of polyvinyl alcohol.

None of the above polymers described in the prior art aqueous fluidized polymer suspensions, however, exhibit all of the desired features of latex paint thickeners. Specifically fluidized polymer suspensions of hydroxyethylcellulose or hydrophobically modified hydroxyethylcellulose, as described in U.S. Pat. No. 4,883,536 or U.S. Pat. No. 5,228,909, typically provide poor flow and leveling to the latex paint, along with an undesirably low high shear (ICI) viscosity. It was therefore desired to create a liquid thickener that would have improved performance in latex paint compared to these prior art thickeners. It was also desirable to combine, if possible, different latex paint rheological modifiers in one liquid carrier so that a combination of properties could be imparted to the latex paint.

SUMMARY OF THE INVENTION

According to the present invention there is provided an aqueous fluid polymer suspension comprising a water-soluble synthetic associative thickener, a water soluble carbon containing salt selected from the group consisting of sodium and potassium salts of aliphatic and aromatic carboxylic acids and sodium and potassium carbonate, and water. The polymer can be selected from the group consisting of hydrophobically modified polyurethanes, hydrophobically modified polyacrylates and hydrophobically modified poly(acetal- or ketal-polyethers) comprising a backbone of poly(acetal- or ketal-polyether) which has ends that are capped with hydrophobic groups independently selected from the group consisting of alky, aryl, arylalkyl, alkenyl, arylalkenyl, cycloaliphatic, perfluoroalkyl, carbosilyl, polycyclyl, and complex dendritic groups wherein the alkyl, alkenyl, perfluoroalkyl, and carbosilyl hydrophobic groups comprise 1 to 40 carbons, and the aryl, arylalkyl, arylalkenyl, cycloaliphatic and polycyclyl hydrophobic groups comprise 3 to 40 carbons.

In another aspect, the present invention provides a process for preparing an aqueous fluid polymer suspension of a water-soluble synthetic associative thickener polymer comprising dissolving the carbon containing salt in water and adding the polymer to and mixing it with the salt solution.

According to the present invention there are further provided processes for thickening aqueous systems by adding the aqueous suspension of the hydrophobically modified water-soluble polymers of the present invention thereto.

DETAILED DESCRIPTION OF THE INVENTION

It has surprisingly been discovered that non-ionic associative thickener, such as hydrophobically modified poly (acetal-polyether) in which the polymer chain has been end capped with terminal cetyl hydrophobes, possesses enhanced thickening characteristics in latex paint. It has been discovered that such polymer can be suspended in aqueous carrier containing dissolved concentrated sodium formate. It has additionally been discovered that suspensions of the hydrophobically modified polymers of the present invention combined with other water-soluble polymers and associative thickeners, such as, hydrophobically modified hydroxyethylcellulose, could be used for thickening latex paints.

Although prior art patents have claimed aqueous sodium formate as a carrier medium for suspending various water-soluble polymers the suspension of the present polymer differs in kind from these prior art compositions with respect to the chemical nature of the suspended polymer species. Novelty of this approach becomes evident with the recognition that the prior art shows that the behavior of various water-soluble polymers, differing in chemical nature, exhibit unpredictable behavior in aqueous solutions containing various salts. For instance, high solids suspensions of water-soluble polymers such as hydroxyethylcellulose and sodium carboxymethyl cellulose can be prepared in concentrated diammonium sulfate, whereas the water-soluble polymers of the present invention, hydrophobically-modified poly (acetal- or ketal polyether), forms a useless agglomerate in that medium. Similarly, it was reported in the prior art that hydroxyethylcellulose can be suspended in an aqueous medium of concentrated sodium formate, whereas sodium carboxymethyl cellulose formed a paste in that medium. Based upon these observed idiosyncracies of water-soluble polymers in concentrated aqueous solutions of various salts it is clear that the prior art is of little utility in predicting in advance which water-soluble polymers may be amenable to preparation of fluid suspensions in a given type of aqueous medium. Accordingly, results obtained by the present invention are unexpected.

The aqueous fluid suspension of the present invention can be prepared from hydrophobically modified polyurethanes, hydrophobically modified polyacrylates and hydrophobically modified poly(acetal- or ketal-polyethers). The hydrophobically modified poly(acetal- or ketal-polyethers) are the subject of U.S. Pat. No. 5,574,127, the disclosure of which is hereby incorporated by reference. Generally, these water-soluble copolymers comprise a backbone of acetal- or ketal-linked polyether which has ends that are capped with hydrophobic groups. The hydrophobic groups can be independently selected from the group consisting of alkyl, aryl, arylalkyl, alkenyl, arylalkenyl, cycloaliphatic, perfluoralkyl, carbosilyl, polycyclyl, and complex dendritic groups, wherein the alkyl, alkenyl, perfluoralkyl, and carbosilyl hydrophobic groups comprise 1 to 40 carbons and the aryl, arylalkyl, arylalkenyl, cycloaliphatic and polycyclyl hydrophobic groups comprise 3 to 40 carbons. Generally the upper limit of the weight average molecular weight of the polymer can be 2,000,000, preferably 500,000 and most preferably 100,000. The lower limit can be about 500, preferably 15,000 and most preferably about 20,000.

Preferably the hydrophobically modified poly(acetal- or ketal-polyethers) used in the present invention are those wherein the hydrophobic groups comprise alkyl and alkenyl groups having 8 to 22 carbon atoms and aryl, arylalkyl, arylalkenyl, cycloaliphatic and polycyclyl groups having 6 to 29 carbon atoms and most preferably wherein such alkyl and alkenyl groups have 12 to 18 carbon atoms and the aryl, arylalkyl, arylalkenyl, cyloaliphatic and polycyclyl groups have 14 to 25 carbon atoms.

The water-soluble polymer to be used in the aqueous suspension of the present invention can be prepared, as disclosed in U.S. Pat. No. 5,574,127, by copolymerizing an alpha, omega-diol, -dithiol or -diamino polyether with a gem-dihalide compound in the presence of a base to from an alpha, omega-diol, -dithiol or diamino poly(acetal- or ketal-polyether) which in turn is reacted with hydrophobic reagents to form the final product. Other paint thickeners such as hydroxyethylcellulose or hydrophobically-modified hydroxyethycellulose can be co-suspended with the poly (acetal- or ketal-polyether)to form a multi-thickener system in a single liquid carrier useful as a rheological modifier additive for latex paint.

In addition to or instead of the hydrophobically modified poly(acetal- or ketal-polyethers) discussed above hydrophobically modified polyether-polyurethanes as described in U.S. Pat. Nos. 4,079,028, 4,155,892, 4,496,708, 4,426,485, 4,499,233, 5,023,309 and 5,281,654, and hydrophobically modified polyether-polyurethanes bearing terminal hydrophilic groups as described in PCT International WO 96/40820, and hydrophobically modified polyether-polyols as described in U.S. Pat. Nos. 4,288,639, 4,354,956, 4,904, 466, and hydrophobically modified polyacrylates U.S. Pat. Nos. 4,514,552, 4,421,902, 4,423,199, 4,429,097, 4,663, 385, 4,008,202, 4,384,096, and 5,342,883 and hydrophobically modified polyacrylamide as described in U.S. Pat. Nos.4,425,469, 4,432,881, 4,463,151, 4,463,152, and 4,722, 962, and hydrophobically modified aminoplast-polyethers as described in PCT International WO 96/40625 and WO 96/40185, can also be used to make the aqueous suspensions of the present invention. The disclosure of these patents are hereby incorporated by reference. Hydrophobically modified polyurethane thickeners are low molecular weight polyether-polyurethane bearing hydrophobes. They are made by condensing relatively low molecular weight polyethylene glycol (molecular weight up to about 10,000) with hydrophobic diisocyanates and end-capping the resulting copolymers with hydrophobic alcohols or amines. They are characterized by having three or more hydrophobes—two of which are terminal and the remainder are internal. The hydrophobic groups are connected to the hydrophilic polyethylene oxide blocks through urethane linkages.

In another class of hydrophobically modified polyurethanes, disclosed in U.S. Pat. No 4,327,008, the hydrophobes have branched structure. They are made by reacting polyalkylene oxides with a polyfunctional material, a diisocyanate, and water and end-capping the resulting product with a hydrophobic monofunctional active hydrogen-containing compound or a monoisocyanate.

Hydrophobically modified polyacrylates are alkali-soluble hydrophobically modified polyacrylates. They are made by copolymerizing a mixture of acrylic monomers with a small amount of a hydrophobic co-monomer.

Salts suitable for use in the present invention are water-soluble, carbon containing salts selected from the group consisting of sodium and potassium salts of aliphatic and aromatic carboxylic acids and sodium and potassium carbonate. As used in the present application the term "water-soluble" regarding suitable carbon containing salts means that such salts are sufficiently soluble in water to result in a concentration of at least 10% of salt based on the weight of the solution. Such salts include, for example, sodium formate, sodium acetate, sodium benzoate, sodium carbonate as well as the potassium analogues thereof. In addition, polymeric species with carboxylic functionality, such as polyacrylate salts which are employed for pigment dispersion can also be used in the present invention. The preferred carboxylic salts are the sodium and potassium salts of carboxylic acids having from 1 to 6 carbon atoms and sodium and potassium carbonate. Most preferred salts are sodium and potassium formate, especially sodium formate.

The above carbon containing salts can also be used in conjunction with other water-soluble non-carbon containing electrolytes for preparing the aqueous suspensions of the present invention. Other water-soluble non-carbon containing electrolytes include, among others for example, sodium, potassium and ammonium chloride, bromide, sulfate, phosphate, borate, nitrate and hydroxide. When employed, generally the ratio of water-soluble non-carbon electrolytes to carbon containing salt is up to about 1:1, preferably, up to about 0.5:1 and most preferably up to about 0.25:1.

The lower limit of the amount of polymer in the aqueous suspension can be about 5% by weight, preferably about 15% and most preferably about 20%. The upper limit of the amount of polymer can be about 40% by weight, preferably about 30% and most preferably about 25%. The lower limit of the amount of carbon containing salt, such as sodium formate, in the aqueous suspension can generally be about 10% by weight, preferably 20% and most preferably 25%. The upper limit of the amount of carbon containing salt can be 45% by weight, preferably 40% and most preferably 35%. Particularly good results are obtained at about 30% by weight. The lower limit of the amount of water can be about 40% by weight, preferably 45% and most preferably 50%. The upper limit of the amount of water can be about 85% by weight, preferably 65% and most preferably 55%.

If desired, a stabilizer can also be used in the aqueous suspensions of the present invention. Examples of suitable stabilizers are xanthan gum, sodium carboxymethyl cellulose, bentonite clays and carrageenan. Preferred stabilizers are xanthan gum and carrageenan, and the most preferred, stabilizer is xanthan gum. The amount of stabilizer can be from 0 to about 1% based on the weight of the aqueous suspension, preferably from about 0.2 to about 0.4% and most preferably from about 0.2 to about 0.3%.

Optionally a preservative can be employed in the aqueous suspensions of the present invention. Suitable preservatives, for example, are Kathon LX, 5-chloro-2-methyl-4-isothiazoline-3-one, (Rohm and Haas); Merbac-35, benzyl bromoacetate, (Calgon); Nuosept 95, bicyclic oxazolidines, (Hüls); Nuosept 101, 4,4-dimethyloxazolidine, (Hüls) and Proxel GXL, 1,2-benzisothiazoline-3-one, (ICI Americas). The amount of preservative can be from 0 to about 0.5% based on the weight of the aqueous suspension, preferably from about 0.05 to about 0.2 and most preferably from about 0.1 to about 0.15%.

The aqueous fluid suspension of the present invention can be prepared by adding a blend of the carbon-containing salt and polymer to water and mixing the salt/polymer blend with the water. Alternatively the aqueous suspension can be made by adding a blend of carbon containing salt, polymer and a stabilizer to water and admixing the salt/polymer/stabilizer blend with the water. The aqueous suspension can also be made by dissolving a stabilizer in water and adding a blend of carbon-containing salt and polymer to and admixing it with the stabilizer solution.

The aqueous suspension of the present invention can also be prepared by simply dissolving the carbon containing salt, such as sodium formate, in water and adding the polymer to and mixing it with the salt solution. As mentioned, a stabilizer can advantageously be employed in the aqueous suspensions of the present invention. The stabilizer can be added anytime, i.e., before the carbon containing salt is dissolved or after the carbon containing salt is dissolved or even after the polymer has been added to the aqueous solution of the carbon containing salt. Preferably the stabilizer is added before the carbon containing salt is dissolved, especially when the carbon containing salt has a tendency to inhibit the dissolution of the stabilizer.

When it is desired to employ a preservative it can be added at any time during the process of preparing the aqueous suspensions of the present invention.

In one embodiment of the present invention the water-soluble polymer is added in fine particulate powder form.

The aqueous suspensions of the present invention can be used for thickening aqueous systems, such as latex paints, sizing systems, adhesives, cosmetics, pharmaceuticals, joint compounds, latices, oil well drilling muds, cementitious systems, paper coatings and mineral slurries. The aqueous suspensions of the present invention can be used by themselves for thickening or they can be used in combination with one or more other thickeners, such as hydroxyethlycellulose and ethylhydroxyethylcellulose, hydrophobically modified hydroxyethylcellulose, hydrophobically modified ethylhydroxyethylcellulose, methylhydroxypropyl cellulose, ethylhydroxyethyl cellulose, carboxymethylcellulose, polyvinyl alcohol, polyurethanes, polyacrylates, polyacrylamides, guar, guar derivatives, clays and alkali-soluble poly-acrylates.

The present invention is illustrated in the following examples, wherein all parts are by weight unless otherwise indicated. These examples are given merely by way of illustration and are not intended to limit the invention as set forth in the claims.

EXAMPLE 1

To an Abbe ribbon blender were added polyethylene glycol (MW-8000) (PEG 8000 1250 g) and sodium hydroxide (37 g). After sealing the reactor, the mixture was heated at 80° C. for one hour. Then dibromomethane (18.5 g) was added to the PEG-8000/NaOH mixture and the resulting reaction mixture heated at 80° C. for for 4 hours to form the PEG-8000/methylene copolymer.

To the PEG-8000/methylene copolymer at 80° C. was added 1-bromohexadecane (65 g) and the resulting reaction mixture was heated at 120° C. for 2 hours. Following this, the reactor was opened and the molten reaction mixture poured in plastic tray. Upon cooling to room temperature, the reaction mixture solidified.

The crude reaction mixture was soluble in water (2% solution BF viscosity at 30 rpm—410 cps).

A quantity of 0.2 part by weight Keltrol RD (Kelco) xanthan gum was dissolved in 49.7 parts by weight of water, then 30 parts by weight of sodium formate was added to the water and dissolved with stirring. After the sodium formate dissolved 20 parts by weight of the above C16 end-capped poly(acetal-polyether) (C16-PAPE) was added to the solution and stirred to disperse. Then 0.1 part of Proxel GXL preservative (1,3-benzisothiazolin-3-one), available from ICI Americas was added to the mixture. A fluid pourable suspension mixture was observed. The suspension set to a mild gel after standing for about 16 hours, but with mild stirring became a pourable liquid and the gel did not reform with further time.

EXAMPLE 2

A quantity of 0.12 part by weight of Keltrol RD (Kelco) xanthan gum was dissolved in 48.88 by weight of water, then 25 parts by weight of sodium formate was added to the water and dissolved with stirring. After the sodium fonnate dissolved 18.75 parts by weight of the C16-PAPE of Example 1 was added to the solution along with 6.25 parts of hydrophobically-modified hydroxyethylcellulose and stirred to disperse. Subsequently 0.9 part of Lomar D condensed napthalene sulfonate dispersant was added to the mixture then 0.1 part by weight of Proxel GXL preservative was added to the mixture. A fluid pourable suspension mixture was observed that did not set to a gel upon standing.

EXAMPLE 3

A sample of the C 16-PAPE of Example 1 was converted to a particle size distribution of 100% passing through U.S. 40 mesh screen by first dissolving the polymer in tetrahydrofuran then drying this solution to form a powder and finally grinding the powder with a mortar and pestle. The powdered polymer sample was added to a concentrated aqueous sodium formate solution to form a fluid suspension in the same manner as in Example 1. It was observed that fluid pourable suspension resulted with a yellow color.

EXAMPLE 4

A sample of the suspension from Example 3 was added as the final ingredient to a standard latex paint formulation. The latex paint formulation employed for these tests is published in trade literature as "UCAR® 367 vinyl-acrylic latex" available from Union Carbide Corporation. In the experiments 200 parts by weight of the base paint recipe, without thickener added, was placed in a mixing vessel, then 50 parts by weight of water and/or thickening agent was added to the base paint to thicken this to a target viscosity. The suspension from Example 3 was employed as the thickener for this latex paint recipe in one experiment, while in a second experiment the dry form of the C16-PAPE of Example 1 was first dissolved in a 1:4 (weight basis) butyl carbitol/water mixture, and then this solution was employed as a thickener for a separate batch of the same paint recipe. It was found in these tests that the two thickeners imparted very similar rheological characteristics to the paints; but that the fluidized polymer suspension from Example 3 provided a significant advantage by being operable at much lower thickener dosage.

Paint characteristics were determined as follows: (a) Stormer viscosity (initial and after overnight storage) is measured by a Stormer viscometer at 200 sec$^{-1}$ shear rate and expressed in Kreb Units (KU); (b) ICI viscosity is measured by an ICI plate and cone viscometer at 12,000 sec$^{-1}$ and expressed in poise; (c) Thickening efficiency (TE) measured as dry wt % thickener needed in the paint to achieve the initial Stormer viscosity; (d) Leveling by Lenata method (measured on a scale of 0–10; 0=worst and 10=best); (e) Sag resistance by Lenata method, mid-range bar, wet film thickness (WFT) (in mils) above which sag occurs; (f) Spatter resistance by roll-out over a black panel (compared on a scale of 0–10; 0=worst and 10=best). (g) 60° Gloss is specular gloss viewed at 60°.

TABLE 1

Comparison of Hydrophobically-modified Poly(acetal-polyether) in Fluidized Polymer Suspension vs Solution Form

| Paint Characteristics | THICKENER | |
| --- | --- | --- |
| | Polymer dissolved in 1:4 butyl carbitol/water | Fluidized Polymer Suspension of Example 3 |
| Thickener Efficiency, TE (wt % of thickener in paint) | 0.83 | 0.52 |
| Stormer Viscosity, (Kreb Units) Initial/Overnight | 94/100 | 97/102 |
| ICI Viscosity | 2.0 | 1.7 |
| Spatter Resistance | 9 | 9 |
| Leveling | 9–10 | 9 |
| Sag Resistance | 8 | 11 |

EXAMPLE 5

A quantity of 49.7 parts by weight of water was added to a mixing vessel, then 0.2 part by weight of Keltrol RD xanthan gum was added to the water and stirred to dissolve. After the xanthan had dissolved into solution, 15 parts by weight of sodium formate and 15 parts by weight of sodium chloride were added to the water and stirred to dissolve. After the salt had dissolved, 20 parts by weight of C16-PAPE of Example 1 was added to the mixture. It was observed in this case that a fluid stable suspension was realized. This suspension became somewhat thicker after overnight storage, but was found to easily remix to form a pourable liquid.

EXAMPLE 6

A quantity of 64.7 parts by weight of water was added to a mixing vessel, then 0.2 part by weight of Keltrol RD xanthan gum was added to the water and stirred to dissolve. After the xanthan had dissolved into solution, 15 parts by weight of sodium formate was added to the water and stirred to dissolve. After the salt had dissolved, 20 parts by weight of C16-PAPE of Example 1, was added to the mixture and stirred to disperse. Then 0.1 part by weight of Proxel GXL preservative was added to the mixture. It was observed in this case that a thick gel was realized.

EXAMPLE 7

A quantity of 49.7 parts by weight of water was added to a mixing vessel, then 0.2 part by weight Keltrol RD xanthan gum was added to the water and stirred to dissolve. After the xanthan had dissolved into solution, 30 parts by weight of sodium formate was added to the water and stirred to dissolve. After the salt had dissolved, 20 parts by weight of C16-PAPE was added to the mixture and stirred to disperse. Then 0.1 part by weight of Proxel GXL preservative was added to the mixture. It was observed in this case that a fluid suspension was formed.

EXAMPLE 8

A quantity of 49.7 parts by weight of water was added to a mixing vessel, then 0.2 part by weight of Keltrol RD xanthan gum was added to the water and stirred to dissolve. After the xanthan had dissolved into solution, 30 parts by weight of sodium chloride was added to the water and stirred to dissolve. After the salt had dissolved, 20 parts by weight C16-PAPE of Example 1, was added to the mixture and stirred to disperse. Then 0.1 part by weight of Proxel GXL preservative was added to the mixture. It was observed in this case that a thick gel was formed.

EXAMPLE 9

The C16-PAPE of Example 1 (350 g) was suspended in tetrahydrofuran (750 ml) in a closed stainless steel pressure reactor and the resulting suspension heated to 60° C. and held at 60° C. for 1 hour. The solution was cooled to room temperature and transferred onto a plastic tray. The solvent was allowed to evaporate inside a hood to obtain a fluffy material that was ground with a mortar and pestle. The ground polymer was screened through 20 U.S. mesh screen.

The bulk density of the screened material (passing through 20 U.S. mesh screen) was 0.4 g/cc.

EXAMPLE 10

Keltrol RD xanthan gum (available from Kelco) (0.6 g) was dissolved in water (164.1 g). To this solution was added sodium formate (75 g) and the resulting mixture stirred till the sodium formate dissolved. Then to this well-agitated solution of xanthan/sodium formate was slowly added finely divided particles (passing through 20 U.S. mesh screen) of C16-PAPE (60 g) prepared according to Example 9. The resulting suspension was stirred for 2 hours after adding 17% solution of 1,3-benzisothiazolin-3-one (0.3 g) and allowed to stand overnight. Next day the suspension was stirred again to form a smooth pourable suspension which was stable after storing at room temperature for two months.

A 2% solution (based on the amount of active C16-PAPE) of the above suspension was made by adding appropriate amount of water. The Brookfield viscosity of this 2% solution, measured at 30 rpm, was 437 cps.

EXAMPLE 11

A C12-PAPE was made according to the procedure of Example 1 using 1-bromododecane (70 g) as the capping agent. 30 g of this C12-PAPE and 70 g of the C16-PAPE of Example 1 were mixed together. Finely divided particles of this blend were made according to Example 9. A stable aqueous suspension was made from this blended polymer system according to Example 10. The suspension was homogeneous, smooth and pourable.

EXAMPLE 12

A C12/C16 mixed hydrophobe end-capped PAPE was made according to Example 1 using 1-bromododecane (20 g) and 1-bromohexadecane (50 g).

A fluffy version of this C12/C16-PAPE was made according to Example 9. An aqueous suspension of this fluffy material passing through U.S.20 mesh screen was made according to Example 10 using the following ingredients.

Xanthan—0.4 g
Water—99.4 g
Sodium formate—50 g
C12/C16—PAPE—50 g
Proxel GXL—0.2 g The suspension was homogenous, pourable and stable.

EXAMPLE 13

Acrysol® RM-825 (available from Rohm and Haas Company) is a 25% solids solution of a hydrophobically modified polyether-polyurethane in 1:4 w/w butyl carbitol/water mixture. In order to recover the solid polymer, the polymer solution (500 g) was poured onto a glass tray and solvent was allowed to evaporate inside a hood. After ten days, a gluey solid was formed. This material was slurried in hexane (1000 ml) and washed three times with hexane (1000 ml) to remove residual organic solvent. The solid polymer thus isolated was dried overnight at room temperature in a vacuum oven. A fluffy solid of this polymer was made according to Example 9.

This fluffy solid of this hydrophobically modified polyether-polyurethane was ground with a mortar and pestle and screened through U.S. 20 mesh screen. The particles passing though 20 U.S. mesh screen was used to make the aqueous suspensions in conjunction with other polymers described in Example 14.

EXAMPLE 14

An aqueous suspension of a 9:21:30 (w/w) blend of the fluffy versions of the C12-PAPE of Example 11, the C12/C16-PAPE of Example 12 and Acrysol®RM-825 hydrophobically modified polyether-polyurethane thickener of Example 13 was made according to Example 10. The aqueous suspension was stable.

EXAMPLE 15

Example 10 was repeated using a 1:3 (w/w) blend of the fluffy versions of C16-PAPE of Example 9 and Acrysol® RM-825 polyether-polyurethane thickener of Example 13. The aqueous suspension was stable.

EXAMPLE 16

A C12/C14-PAPE was made according to Example 1 using 1-bromododecane (55 g) and 1-bromotetradecane (28 g). The isolated solid polymer was ground in a coffee grinder and the ground polymer screened through U.S. 20 mesh screen.

An aqueous suspension of this screened material was made according to Example 10 using the following materials:

Xanthan—0.4 g
Water—99.4 g
Sodium formate—50 g
C12/C14-PAPE (particles screened through U.S. 20 mesh screen)—50 g
Proxel GXL—0.2 g When allowed to stand for 12 hours at room temperature, the aqueous suspension gelled and the polymer particles phase separated.

By contrast when the same C12/C14-PAPE was converted into a fluffy material according to Example 9 and an aqueous suspension was made according to Example 10 using the above ingredients and the fluffy version of C12/C14-PAPE (passing through 20 U.S. mesh screen), a stable suspension was formed.

EXAMPLE 17

Example 16 was repeated using a C12/C16-PAPE made according to Example 1 using 1-bromododecane (20 g) and 1-bromohexadecane (50 g). It was found that the C12/C16-PAPE powder made by grinding the solid polymer in a coffee grinder and screened through 20 U.S. mesh screen did not form a stable suspension. By contrast, the fluffy version of the C12/C16-PAPE made according to Example 9 formed a stable suspension.

EXAMPLE 18

A dry blend of Keltrol RD xanthan gum (0.3 g), sodium formate (37.5 g) and fluffy version of C16-PAPE (30 g) was added to water (82.05 g) and the resulting mixture was mixed for 3 hours to obtain a homogeneous suspension of the C16-PAPE. To this suspension was added Proxel® GXL preservative (17% solution of 1,3-benzisothiazolin-3-one) (0.3 g). The suspension was stable, i.e., there was no phase separation after storing overnight at room temperature.

EXAMPLE 19

Keltrol RD xanthan gum (0.3 g) was dissolved in water (82.05 g). To this xanthan solution was added a mixture of sodium formate (37.5 g) and C16-PAPE of Example 1 (30 g). The resulting mixture was mixed for 3 hours to obtain a homogeneous suspension of the C16-PAPE. To this suspension was added Proxel® GXL preservative (17% solution of 1,3-benzisothiazolin-3-one) (0.3 g). The suspension was stable, i.e., there was no phase separation after storing overnight at room temperature.

EXAMPLE 20

A mixture of sodium formate (37.5 g) and the C16-PAPE of Example 1 was added to water (82.05 g). After mixing the mixture for an hour a suspension of the C16-PAPE was formed. To this suspension was added Proxel® GXL preservative (17% solution of 1,3-benzisothiazolin-3-one) (0.3 g). Upon overnight storage at room temperature, the suspension phase separated. However, after gentle stirring, a homogeneous suspension was obtained.

EXAMPLE 21

An aqueous suspension of solid (100% active) Acrysol® RM-825 hydrophobically modified polyether-polyurethane was made as follows: Keltrol RD xanthan gum (available from Kelco) (0.6 g) was dissolved in water (164.1 g). To this solution was added sodium formate (75 g) and the resulting mixture stirred till the sodium formate dissolved. Then to this well-agitated solution of xanthan/sodium formate was slowly added finely divided particles (passing through U.S. 20 mesh screen) of Acrysol® RM-825. The resulting suspension was stirred for 2 hours after adding 17% solution of 1,3-benzisothiazolin-3-one (0.3 g). When this aqueous suspension was allowed to stand overnight, a top layer comprised of suspended polymer particles resulted. However, after mixing the suspension, the polymer particles were homogeneously distributed in the aqueous phase.

EXAMPLE 22

Rheolate®300 hydrophobically modified polyether-polyol (available as a ~35% by weight solution in butyl carbitol/water mixture from Rheox, Inc., Hightstown, N.J.) (307 g) was dried overnight at 80° C. in a convection oven to obtain a slightly brown syrupy liquid (107 g) which did not solidify upon cooling to room temperature.

The solvent-free (100% active) Rheolate® 300 hydrobically modified polyether-polyol (30 g), which was a syrupy liquid at room temperature, was added to a solution of sodium formate (38 g), xanthan (0.3 g) and Proxel® GXL (0.3 g) in water (82.2 g) under strong agitation to form an emulsion. Upon standing, the liquid polymer floated to the top. However, upon stirring, the polymer dispersed to form an emulsion again.

EXAMPLE 23

Rheolate® 205 is a polyurethane associative thickener available from Rheox. Inc. This product is 100% active. An aqueous suspension of the above Rheolate® 205 polyurethane associative thickener was made following the procedure of Example 21 wherein Rheolate® 205 was substituted for Acrysol® RM-825. The suspension was stable.

EXAMPLE 24

Rheolate® 208 is a polyurethane associative thickener available from Rheox. Inc. This product is 100% active. An aqueous suspension of the above Rheolate® 208 polyurethane associative thickener was made following the procedure of Example 21. The aqueous suspension was stable.

EXAMPLE 25

Coatex® BR 910 P is a polyurethane associative thickener available from Coatex, France. This product is 100% active. An aqueous suspension of Coatex® BR 910 P polyurethane associative thickener was made following the procedure of Example 21 wherein Coatex® BR 910 P was substituted for Acrysol® RM-825. The aqueous suspension was stable.

COMPARATIVE EXAMPLE 1

A quantity of 49.7 parts by weight of water was added to a mixing vessel, then 0.2 part by weight of Keltrol RD xanthan gum was added to the water and stirred to dissolve. After the xanthan had dissolved 15 parts by weight of sodium formate and 15 parts by weight of diammonium phosphate were added to the solution and stirred to dissolve. After the salts had dissolved, 20 parts by weight of the C16-PAPE of Example 1 was added to the mixture and stirred to disperse. Then 0.1 part by weight of Proxel GXL preservative was added to the mixture. It was observed in this case that a thick gel was obtained.

EXAMPLE 26

A quantity of 49.7 parts by weight of water was added to the mixing vessel, then 0.2 part by weight of Keltrol RD xanthan gum was added to the water and stirred to dissolve. After the xanthan had dissolved 30 parts by weight of potassium carbonate was added to the water and stirred to dissolve. After the salt had dissolved, 20 parts by weight of the C16-PAPE of Example 1 was added to the mixture and stirred to disperse. Then 0.1 part by weight of Proxel GXL preservative was added to the mixture. It was observed in this case that a fluid suspension was formed.

EXAMPLE 27

Acrysol® TT-935, hydrophobically modified polyacrylate (available from Rohm & Haas Company as a latex emulsion in water) (30% solids) was dried overnight in a convection oven at 80° C. to obtain a film. The film was pulverized in a Wiley mill and the particles sieved through U.S. 20-mesh screen.

An aqueous suspension of solid Acrysol® TT-935 hydrophobically modified polyacrylate was made according to Example 2 using the following ingredients.
 a) Xanthan gum—0.15 g
 b) Water—41.1 g
 c) Sodium formate—19 g
 d) Acrysol® TT-935 powder—15 g (sieved through U.S. 20 mesh screen)

The aqueous suspension of Acrysol® TT-935 hydrophobically modified polyacrylate was stable.

EXAMPLE 28

Keltrol RD (Kelco) xanthan gum (0.15 g) was dissolved in water (41.1 g). To this solution was added under strong agitation Acrysol® TT-935powder (15. g) (prepared in Example 27). The resulting mixture was mixed for 1 hour to obtain a stable suspension of the polymer.

EXAMPLE 29

UCAR® Polyphobe® 111 hydrophobically modified polyacrylate polyurethane (available from Union Carbide Company, as a latex emulsion in water) (25% solids) was dried overnight in a convection oven at 80° C. to obtain a soft film. The film was frozen in liquid nitrogen to harden it. The hardened film was ground in a Wiley mill and the particles sieved through U.S. 20-mesh screen.

An aqueous suspension of solid UCAR® Polyphobe® 111 hydrophobically modified polyacrylate polyurethane was made according to Example 2 using the following ingredients:
 a) Xanthan gum—0.15 g
 b) Water—41.4 g
 c) Sodium formate—19 g
 d) UCAR® Polyphobe®—111-15 g (sieved through U.S. 20-mesh screen)

The aqueous suspension of UCAR® Polyphobe® 111 hydrophobically modified polyacrylate polyurethane was stable.

EXAMPLE 30

Hydrophobically modified polyacrylamide is prepared as follows: A two-liter, four-necked flask equipped with a thermometer, heater, condenser, stirrer, and nitrogen inlet source is charged with 200 g acrylamide, 400 g tert-butanol, 1 g n-dodecyl mercaptan (n-C12SH) and 1350 g deionized water. This corresponds to 2.5 milliequivalents mercaptan per 100 g of monomer (2.5 me/100 g monomer). The mixture is stirred under nitrogen for 1.0 hour and heated to 80° C. A solution of 0.4 g ammonium persulfate in 10.0 g deionized water is then added to initiate polymerization. An immediate evolution of heat is observed with the temperature rising to 84° C., the reflux temperature, and subsiding within 5 minutes. The temperature is maintained at 80° C. for 3 hours. Residual monomer is reduced by means of an ammonium persulfate chaser system. The tert-butanol is removed by a steam sparge to produce a colorless, translucent suspension. The weight average molecular weight, Mw is 118,000.

The hydrophobically modified polyacrylamide suspension is evaporated to dryness to form a film. Grind the film using a mill and sieve the polymer powder through U.S. 20-mesh screen.

Use the above fine polymer particles, to prepare a stable aqueous suspension by adding 60 g of the particulate polymer to a solution of xanthan gum (0.6 g), sodium formate (75 g) and Proxel GXL (0.3 g) in water (164.1 g) following the procedure of Example 1.

What is claimed:

1. An aqueous fluid suspension comprising a water-soluble synthetic associative thickener polymer, a water-soluble carbon containing salt selected from the group consisting of sodium and potassium salts of aliphatic and aromatic carboxylic acid and sodium and potassium carbonate and water, wherein the polymer is selected from the group consisting of hydrophobically modified polyether-polyurethanes, hydrophobically modified polyether-polyurethanes bearing terminal hydrophilic groups, hydrophobically modified polyacrylates, hydrophobically modified polyether-polyols, hydrophobically modified aminoplast-polyethers and hydrophobically modified poly(acetal- or ketal-polyethers) comprising a backbone of poly(acetal- or ketal-polyether) which has ends that are capped with hydrophobic groups independently selected from the group consisting of alkyl, aryl, arylalkyl, alkenyl, arylalkenyl, cycloaliphatic, perfluoroalkyl, carbosilyl, polycyclyl, and complex dendritic groups wherein the alkyl, alkenyl, perfluoroalkyl, and carbosilyl hydrophobic groups comprise 1 to 40 carbons, and the aryl, arylalkyl, arylakenyl, cycloaliphatic and polycycyl hydrophobic groups comprise 3 to 40 carobns.

2. The aqueous suspension of claim 1 wherein the upper limit of the weight average molecular weight of the polymer is about 2,000,000.

3. The aqueous suspension of claim 1 wherein the lower limit of the weight average molecular weight of the polymer is about 500.

4. The aqueous suspension of claim 1 wherein the lower limit of the amount of polymer is about 5% by weight, the lower limit of the amount of water-soluble carbon containing salt is about 10% by weight, the lower limit of the amount of water is about 40% by weight, said suspension further comprising from 0 to about 1% by weight of stabilizer and optionally a preservative.

5. The aqueous suspension of claim 1 wherein the upper limit of the amount of polymer is about 40% by weight, the upper limit of the amount of water-soluble carbon containing salt is about 45% by weight, and the upper limit of the amount of water is about 85% by weight.

6. The aqueous suspension of claim 1 wherein the water-soluble carbon containing salt is selected from the group consisting of sodium and potassium salts of carboxylic acids and having from 1 to 6 carbon atoms and sodium and potassium carbonate.

7. The aqueous suspension of claim 1 additionally comprising a water-soluble non carbon containing salt in a ratio of up to about 1:1 based on the weight of the carbon containing salt.

8. The aqueous suspension of claim 1 wherein said suspension further comprises a stabilizer selected from the group consisting of xanthan gum, sodium carboxymethyl cellulose, bentonite clays and carrageenan.

9. The aqueous suspension of claim 3 wherein the lower limit of the weight average molecular weight of the polymer is about 500, the lower limit of the amount of polymer is about 5% by weight, the lower limit of the amount of water-soluble carbon containing salt is about 10% by weight, the lower limit of the amount of water is about 40% by weight, said suspension further comprising from 0 to about 1% by weight of stabilizer selected from the group consisting of xanthan gum, sodium carboxymethyl cellulose, bentonite clays and carrageenan and optionally a preservative and the upper limit of the amount of polymer is about 40% by weight, the upper limit of the amount of water-soluble carbon containing salt is about 45% by weight, and the upper limit of the amount of water is about 85% by weight and the water-soluble carbon containing salt is selected from the group consisting of sodium and potassium salts of carboxylic acids and having from 1 to 6 carbon atoms and sodium and potassium carbonate.

10. The aqueous suspension of claim 9 wherein the polymer is poly(acetal- or-ketal-polyether) wherein the alkyl and alkenyl groups have 8 to 22 carbon atoms and the aryl, arylalkyl, arylalkenyl, cycloaliphatic and polycyclyl groups have 6 to 29 carbon atoms.

11. The aqueous suspension of claim 9 wherein the lower limit of the weight average molecular weight of the polymer is about 15,000.

12. The aqueous suspension of claim 9 wherein the upper limit of the weight average molecular weight of the polymer is about 500,000.

13. The aqueous suspension of claim 9 wherein the lower limit of the amount of polymer is about 15% by weight, the lower limit of the amount of water-soluble carbon containing salt is about 20% by weight, the lower limit of the amount of water is about 45% by weight, the lower limit of the amount of stabilizer is about 0.2% by weight and the lower limit of the amount of preservative is about 0.05% by weight.

14. The aqueous suspension of claim 9 wherein the upper limit of the amount of polymer is about 30% by weight, the upper limit of the amount of water-soluble carbon containing salt is about 40% by weight, the upper limit of the amount of water is about 65% by weight, the upper limit of the amount of stabilizer is about 0.4% by weight and the upper limit of the amount of preservative is about 0.2 by weight.

15. The aqueous suspension of claim 9 wherein the stabilizer is selected from the group consisting of xanthan gum and carrageenan.

16. The aqueous suspension of claim 9 wherein the water-soluble carbon containing salt is selected from the group consisting of sodium and potassium formate.

17. The aqueous suspension of claim 9 additionally comprising a water-soluble non-carbon containing electrolyte in a ratio of up to about 0.5:1 based on the weight of the carbon containing salt.

18. The aqueous suspension of claim 10 wherein the lower limit of the weight average molecular weight of the polymer is about 15,000, the upper limit of the weight average molecular weight of the polymer is about 500,000, the lower limit of the amount of polymer is about 15% by weight, the lower limit of the amount of water-soluble carbon containing salt is about 20% by weight, the lower limit of the amount of water is about 45% by weight, the lower limit of the amount of stabilizer is about 0.2% by weight and the lower limit of the amount of preservative is about 0.05% by weight, the upper limit of the amount of polymer is about 30% by weight, the upper limit of the amount of water-soluble carbon containing salt is about 40% by weight, the upper limit of the amount of water is about 65% by weight, the upper limit of the amount of stabilizer is about 0.4% by weight and the upper limit of the amount of preservative is about 0.2% by weight, the stabilizer is selected from the group consisting of xanthan gum and carrageenan, and wherein the water-soluble carbon containing salt is selected from the group consisting of sodium and potassium formate.

19. The aqueous suspension of claim 18 wherein the weight average molecular weight of the polymer is from about 20,000 to about 100,000, the alkyl and alkenyl groups have 12 to 18 carbon atoms and the aryl, arylalkyl, arylkenyl, cycloaliphatic and polycyclyl groups have 14 to 25 carbon atoms.

20. The aqueous suspension of claim 18 wherein the amount of polymer is from about 20 to about 25% by weight, the water-soluble carbon containing salt is sodium formate, the amount of sodium formate is from about 25 to about 35% by weight and the amount of water is from about 50 to about 55% by weight.

21. The aqueous suspension of claim 18 wherein the amount of stabilizer is from about 0.2 to about 0.3% by weight, the amount of preservative is from about 0.1 to about 0.15% by weight, the stabilizer is xanthum gum and the preservative is selected from the group consisting of 5-chloro-2-methyl4-isothiazoline-3-one, benzyl bromoacetate, bicyclic oxazolidines, 4,4-dimethyloxazolidine and 1,2-benzisothiazoline-3-one.

22. The aqueous suspension of claim 19 wherein the amount of polymer is from about 20 to about 25% by weight, the water-soluble carbon containing salt is sodium formate, the amount of sodium formate is from about 25 to about 35% by weight and the amount of water is from about 50 to about 55% by weight, the amount of stabilizer is from about 0.2 to about 0.3% by weight, the amount of preservative is from about 0.1 to about 0.15% by weight, the stabilizer is xanthan gum and the preservative is selected from the group consisting of 5-chloro-2-methyl-4-isothiazoline-3-one, benzyl bromoacetate, bicyclic oxazolidines, 4,4-dimethyloxazolidine and 1,2-benzisothiazoline-3-one.

23. The aqueous suspension of claim 22 wherein the amount of sodium formate is about 30% by weight.

24. The aqueous system of claim 10 wherein the alkyl groups have 16 carbon atoms.

* * * * *